(12) United States Patent
Creamer et al.

(10) Patent No.: US 7,167,917 B2
(45) Date of Patent: Jan. 23, 2007

(54) VISUAL TOOL FOR DEVELOPING SERVICE COMPONENTS FOR USE IN ADVANCED INTELLIGENT NETWORKS

(75) Inventors: Thomas E. Creamer, Boca Raton, FL (US); Zygmunt A. Lozinski, Papworth Everard (GB); Joseph H. McIntyre, Austin, TX (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/038,590

(22) Filed: Jan. 3, 2002

(65) Prior Publication Data

US 2003/0126584 A1 Jul. 3, 2003

(51) Int. Cl.
*G06F 15/16* (2006.01)
*G06F 15/173* (2006.01)

(52) U.S. Cl. .................. 709/227; 709/228; 709/238
(58) Field of Classification Search ......... 709/220–226
See application file for complete search history.

(56) References Cited

U.S. PATENT DOCUMENTS

| | | | |
|---|---|---|---|
| 5,930,700 A * | 7/1999 | Pepper et al. ............ | 455/435.3 |
| 6,260,035 B1 * | 7/2001 | Horvitz et al. ............... | 706/60 |
| 6,445,774 B1 * | 9/2002 | Kidder et al. ............. | 379/9.03 |
| 6,502,131 B1 * | 12/2002 | Vaid et al. .................. | 709/224 |
| 6,701,513 B1 * | 3/2004 | Bailey ....................... | 717/109 |
| 6,754,470 B1 * | 6/2004 | Hendrickson et al. ... | 455/67.11 |
| 6,757,362 B1 * | 6/2004 | Cooper et al. .......... | 379/88.01 |
| 6,763,104 B1 * | 7/2004 | Judkins et al. ......... | 379/265.09 |
| 6,768,994 B1 * | 7/2004 | Howard et al. ............. | 707/10 |
| 6,782,508 B1 * | 8/2004 | Bahrs et al. ............... | 715/526 |
| 6,956,845 B1 * | 10/2005 | Baker et al. ............... | 370/352 |

* cited by examiner

*Primary Examiner*—Ario Etienne
*Assistant Examiner*—Hussein El-chanti
(74) *Attorney, Agent, or Firm*—Akerman Senterfitt

(57) ABSTRACT

A method for visually generating a service component can include specifying at least one service building block, wherein the specification includes visually selecting a plurality of event handlers for inclusion in the at least one service building block. The method can also include exporting the at least one service building block. The exporting step can produce a deployment descriptor which describes events for which the at least one service building block has been configured to handle. The at least one service block can be visually arranged, wherein the arrangement can form the service component. Finally, the service component produced by the visual arrangement can be configured for insertion in a SLEE in an advanced intelligent network. Notably, in one aspect of the method, the method can further include the step of encapsulating the service component in a service application container.

9 Claims, 14 Drawing Sheets

VISUAL TOOL FOR DEVELOPING SERVICE COMPONENTS FOR USE IN ADVANCED INTELLIGENT NETWORKS

BACKGROUND OF THE INVENTION

1. Technical Field

This invention relates to visual software development tools, and more particularly to a visual tool for creating service components for use in advanced intelligent networks.

2. Description of the Related Art

The development of the open network application programming interface (API) represents an important departure from traditional methods for opening the architecture of the public switched telephone network (PSTN). One such open network API, the Advanced Intelligent Network (AIN) API and architecture, defines a call model which allows the creation of telecommunications service applications outside of the switch environment. Telecommunications service applications are a' la carte telecommunications applications which can perform enhanced services for a telecommunications session established among two or more parties. Exemplary services applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that in software and information technology in general, with customers reaping the benefits of increased competition, reduced time to market, and the rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN) fulfills the requirements of the new service application component development paradigm. Presently, JAIN includes standard, open, published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. These protocols can include TCAP, ISUP, INAP, MAP, SIP, MGCP, and H.323. The JAIN implementation also can include a signaling layer 103 which can include interfaces to provide connectivity management and call control. The conventional JAIN implementation also can include an application layer 104 for handling secure network access and other external services. Finally, the conventional JAIN implementation can include a service layer 106 which can include a service creation and carrier grade service logic execution environment (SLEE) 108.

In JAIN, the protocol layer 102 and the signalling layer 103 are based upon a Java standardization of specific signaling protocols and provide standardized protocol interfaces in an object model. Additionally, applications and protocol stacks can be interchanged, all the while providing a high degree of portability to the applications in the application layer using protocol stacks from different sources. By comparison, the application layer 104 provides a single call model across all supported protocols in the protocol layer 102. Fundamentally, the application layer 104 provides a single state machine for multiparty, multimedia, and multiprotocol sessions for service components in the application layer 104. This state machine is accessible by trusted applications that execute in the application layer 104 through a call control API.

Notably, applications or services executing at the service level 102 can communicate directly with protocol adapters in the SLEE 108. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 104 does not have to be aware of the underlying resources and can remain oblivious to the fact that some of its session or call legs may be using different protocols.

Service components 112 are the core JAIN components and can execute in the SLEE 108. More particularly, service components 112 are constructed according to a standard component model and, instantiations of component assemblies execute in coordination with the SLEE 108. Using information regarding the protocol layer 102 which can be incorporated into the SLEE 108, service components 112 can interact with the underlying protocol stacks without having specific knowledge of the protocol stack. Thus, service components 112 can use the call model provided by the signaling layer to implement telephony services. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony services.

Despite the inherent efficiencies of the use JAIN and other like minded integrated network architectures, however, the actual development of service components remains a challenging task. Unlike convention computer applications in which visual tools have provided a simplified mechanism for developing computer programs, the service components of JAIN do not enjoy similar development environments. Notably, visual tools have been used for many years in the development of computing applications. Such visual tools, often referred to as application development environments (ADEs) or integrated development environments (IDEs), have focused on the circumstance where an operating system or computer communications network provides the foundation for generated applications. To date, however, visual tools have not been used to develop applications where an advanced intelligent network provides the foundation for the application. In particular, presently visual tools have not been developed in which service components can be easily and efficiently created for use in the SLEEs of integrated networks.

SUMMARY OF THE INVENTION

The present invention is a visual tool which can be used to create service components for use in a service logic execution environment (SLEE) in an integrated network such as a JAIN-compliant network. The present invention solves the deficiencies of the prior art by providing a visual tool through which service components can be created using drag-and-drop and smartguide techniques well known in the art. Furthermore, by providing an intuitive graphical user interface through which service building block characteristics can be specified, a non-specialist can create service components for use in a SLEE without undertaking the tedious task of hand-coding such service components.

A visual tool for creating a service component for use in a SLEE can include a first visual smartguide for creating service building blocks. Each service building block can include at least one event handler for handling specific events received from an event routing bus in the SLEE. The visual tool also can include a second visual smartguide for creating deployment descriptors for the created service building blocks. Each deployment descriptor can include a service description and a list of supported events which can be handled by an associated service building block. Finally, the visual tool can include a visual composition interface through which visual representations of the service building blocks can be arranged to form the service component. Notably, the service building blocks can be software components, for example Java beans.

In one aspect of the visual took, the first visual smartguide can include at least one selectable procedure for generating a plurality of utility classes for inclusion in a service building block. In addition, the first visual smartguide can include a database of event handlers from which the at least one event handler can be selected for addition to the service building block. Likewise, the second visual smartguide can include a database of event handlers from which a list of supported events for inclusion in the deployment descriptor can be constructed. Finally, the visual tool can further include a service container which encapsulates the service component.

A method for visually generating a service component can include specifying at least one service building block, wherein the specification includes visually selecting a plurality of event handlers for inclusion in the at least one service building block. The method can also include exporting the at least one service building block. The exporting step can produce a deployment descriptor which describes events for which the at least one service building block has been configured to handle. The at least one service block can be visually arranged, wherein the arrangement can form the service component. Finally, the service component produced by the visual arrangement can be configured for insertion in a SLEE in an integrated network. Notably, in one aspect of the method, the method can further include the step of encapsulating the service component in a service component container.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a visual tool for creating and exporting service components for use in a service logic execution environment (SLEE) in an integrated network. The visual tool can solve the deficiencies of the prior art by providing an intuitive development environment in which service component developers can create service building blocks using visual smartguides. Subsequently, the created service building blocks can be arranged graphically in using a visual composition portion of the visual tool. The arrangement can form a service component which can be exported for use in a SLEE. In particular, the process of exporting the service component can include the creation of a deployment descriptor which can be used by the SLEE to properly load and configure the service component for use therein.

Figure 1:
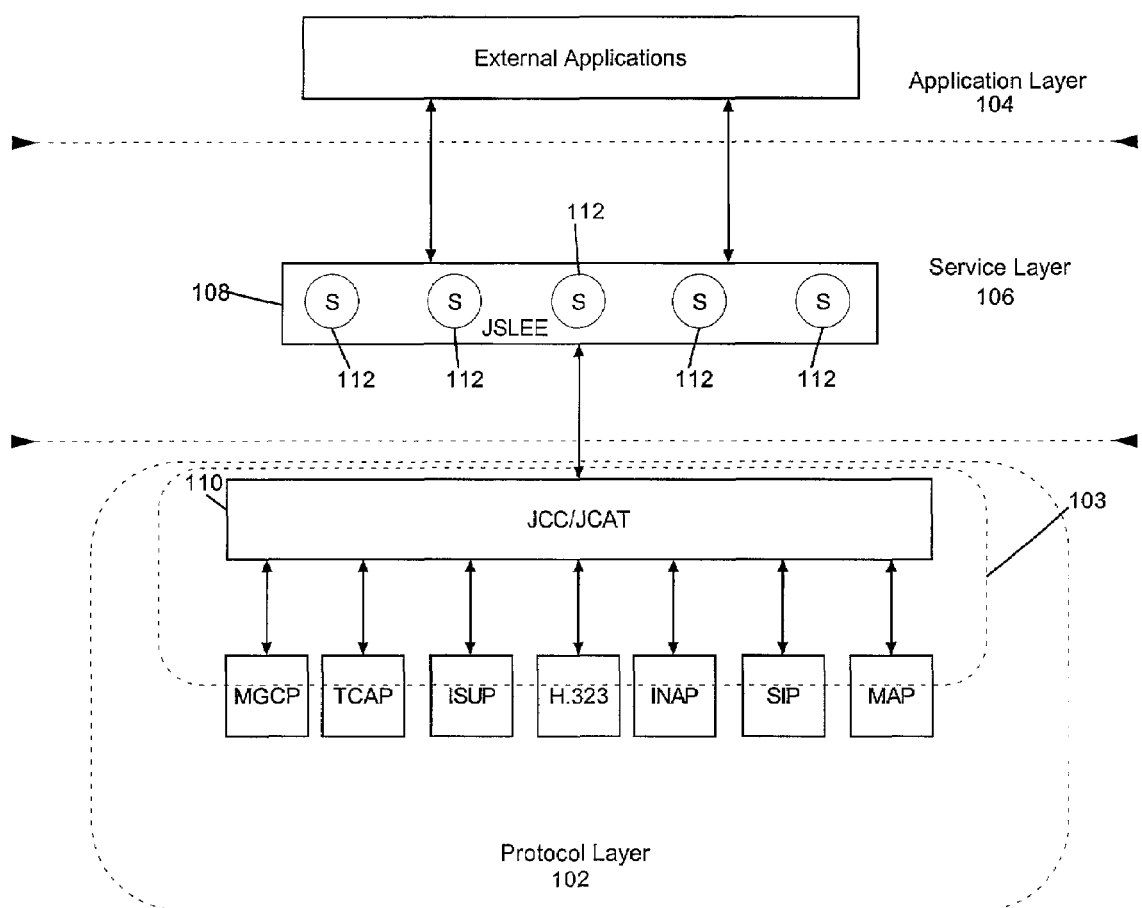
FIG. 1 is a schematic representation of an intelligent network architecture configured in accordance with a conventional JAIN implementation known in the prior art.
Figure 2:
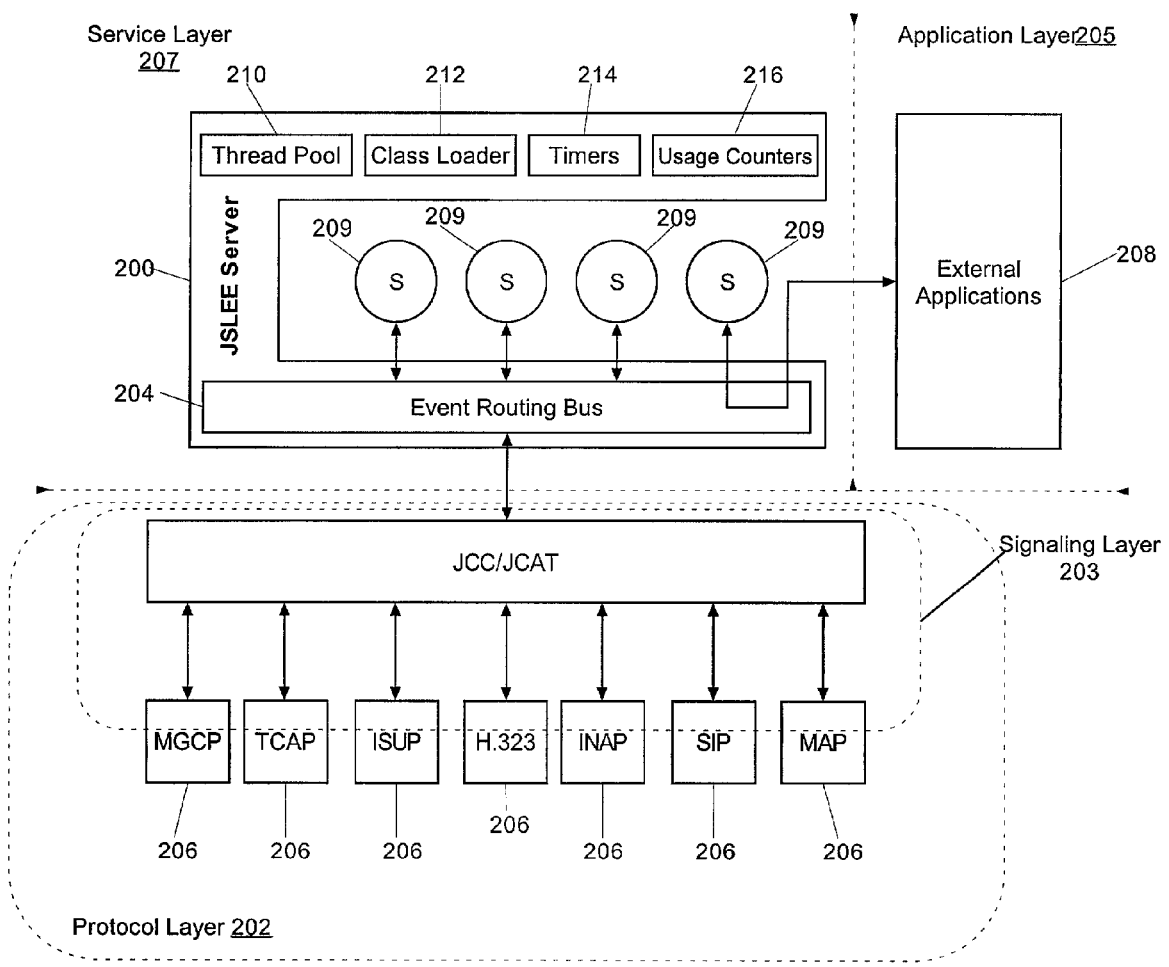
FIG. 2 is a schematic representation of an intelligent network architecture including a service logic execution environment (SLEE) configured in accordance with the inventive arrangements.

The SLEE of the present invention can be configured for compatibility with the Java Advanced Intelligent Network (JAIN) specification. FIG. 2 is a schematic illustration of a JAIN-compliant intelligent network configured in accordance with the inventive arrangements. A JAIN-compliant network configured in accordance with the inventive arrangements can include a protocol layer 202, a signaling layer 203, an application layer 205 and a service layer 207. The application layer 205 can host external third party applications 208. Typical third party applications 208 can suit mass-market demand for services such as virtual private networks (VPNs), inbound services and unified messaging. External third party applications 208 also can include short-lived and niche applications which can be deployed using un-trusted application space deployment technologies such as database lookup interfaces, downloadable mechanisms, and the Parlay API, as are well known in the art. The service layer 207 can include a SLEE server such as a JSLEE Server 200 which can be configured for compatibility with the JAIN specification. The protocol layer 201 can include one or more protocol stacks 206 which can be configured to interact with service components 209 executing in the JSLEE Server 200 through a signaling layer 203. Notably, although FIG. 2 only depicts seven protocol stacks 206, the invention is not limited in regard to the number or type of protocol stacks 206. Rather, JSLEE Server 200 can interact with any protocol stack, for example those protocol stacks configured in accordance with the JAIN specification.

The JSLEE Server 200 also can include several lifecycle management components including a thread pool 210, a class loader 212, timers 214 and usage counters 216. Still, the lifecycle management components are not limited to those shown in FIG. 2. Rather, the lifecycle management components can include components able to perform other lifecycle management responsibilities such as load balancing, for example. In any case, in accordance with the inventive arrangements, individual service components are freed from the overhead of performing lifecycle management and can be used more appropriately in telephony applications. Notably, as shown in FIG. 2, the thread pool 210 can include a plurality of pre-configured and loaded execution threads which can be allocated by a thread pool management component, on demand, to requesting service components 209 executing in the JSLEE Server 200. When the requesting service components 209 have completed use of the allocated thread, the thread pool management component can de-allocate the allocated thread and can return the de-allocated thread to the thread pool 210 for use by other requesting service components 209 executing in the JSLEE Server.

The class loader 212 can be used by the JSLEE Server 200 to properly load service components 209 for execution in the JSLEE Server 200. In particular, the class loader 212 can identify configuration and loading parameters associated with each service component 209 to be loaded. Subsequently, the class loader 212 can execute the service components 209 using the identified configuration and loading parameters. Finally, the class loader 212 can register the service components 209 with the event routing bus 204 so that events can be transmitted to and from the service components 209 executing in the JSLEE Server 200.

In operation, the JSLEE Server 200 can transmit and receive events to and from the protocol stacks 206 in the protocol layer 201. More particularly, the events can be transmitted and received in an event routing bus 204 included in the JSLEE Server 200. Likewise, service components 209 which are registered with the JSLEE Server can receive protocol stack events directed towards particular ones of the service components 209. More specifically, the event routing bus 204 can route received events to service components 209 which have registered with the JSLEE Server 200 to receive such events.

Importantly, the event routing bus 204 also can receive and transmit messages between service components 209. Specifically, service components 209 can be configured to post messages to the event routing bus 204 and service components 209 can register with the JSLEE Server 200 to receive such posted events from other service components 209. In this way, inter-service component communications can be made possible. Finally, service components 209 can be configured to receive events from external applications 208 via the event routing bus 204. Also, those events which are received from external applications 208 and posted to the event bus 204 can be routed to other service components 209 that have registered to receive such events.

Figure 3:
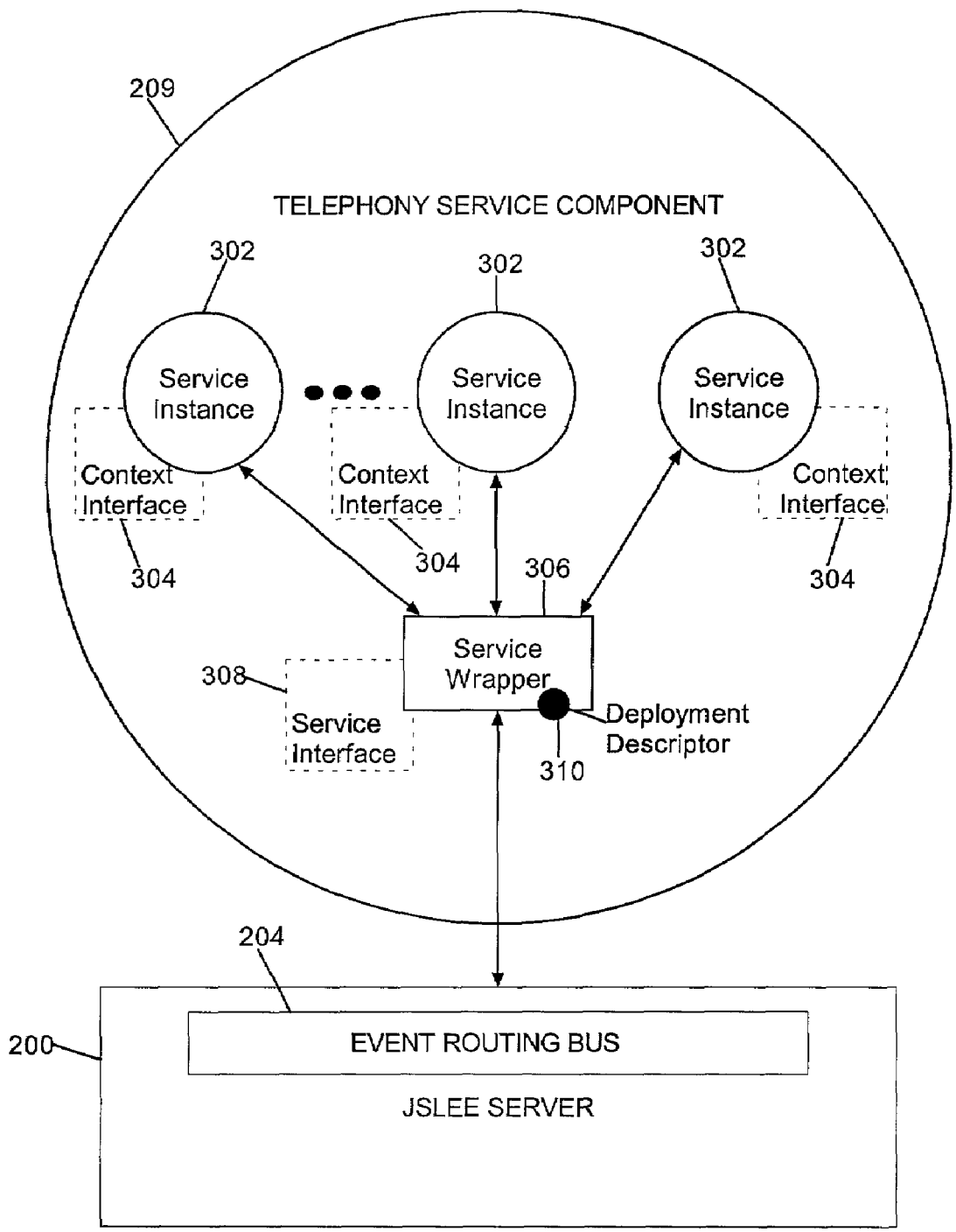
FIG. 3 is a detailed illustration of a service component configured for execution in the SLEE of FIG. 2.

FIG. 3 is a schematic representation of a service component 209 configured for use in the JSLEE Server 200 of FIG. 2. As shown in FIG. 3, the service component 209 can include one or more service instances 302. Service instances 302 are individually instantiated services which can execute in the JSLEE 200. More importantly, each service instance 302 can register with the event routing bus 204 to receive and transmit events to the protocol layer 202 as well as other service components 209. Each service instance 302 can be accessed through service wrapper 306 which insulates the details of the service instance implementation. More particularly, data and method members of the service class can be accessed through a common interface contained in the service wrapper 306.

A deployment descriptor 310 also can be provided. The deployment descriptor 310 can be a document, for instance an XML document, which can describe proper parameters for initially loading an instance of the service component 209 in the JSLEE Server 200. Accordingly, the service instance 302 can register with the event routing bus 204 via the service wrapper 306, and specifically the deployment descriptor 310, to receive and transmit events to the protocol layer 202 and other service components 209. Notably, an interface to the service wrapper 306 can be published to external objects through a service interface 308 which can be included as part of an XML document, for example. Likewise, an interface to each service instance 302 can be included as part of a context interface 304, which also can be published as part of an XML document, for example. Once loaded, service instances 302 can communicate via the event routing bus 204 in the JSLEE Server 200.

Figure 4:
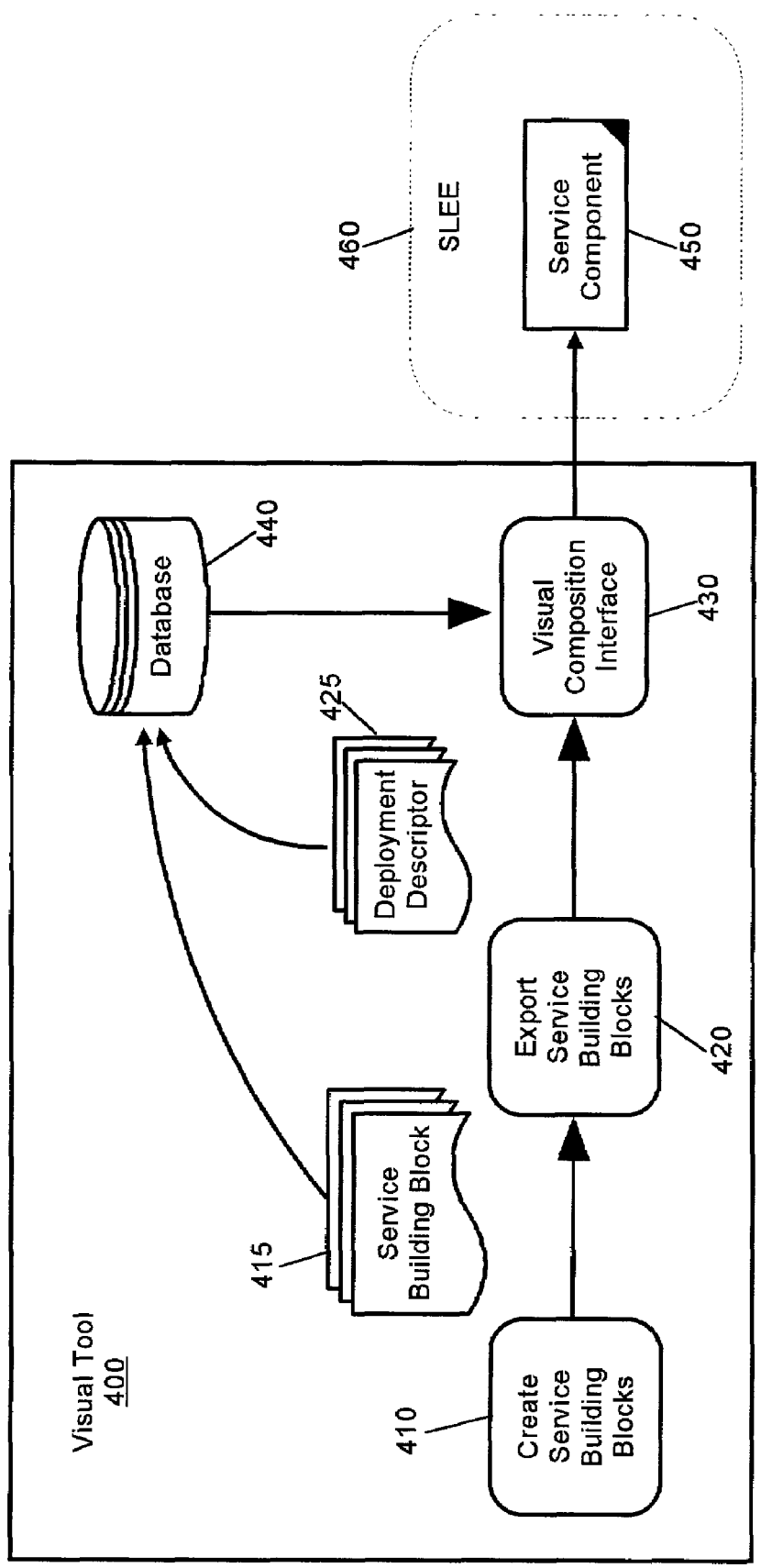
FIG. 4 is a schematic illustration of a visual tool which has been configured in accordance with the inventive arrangements.
Figure 5A:
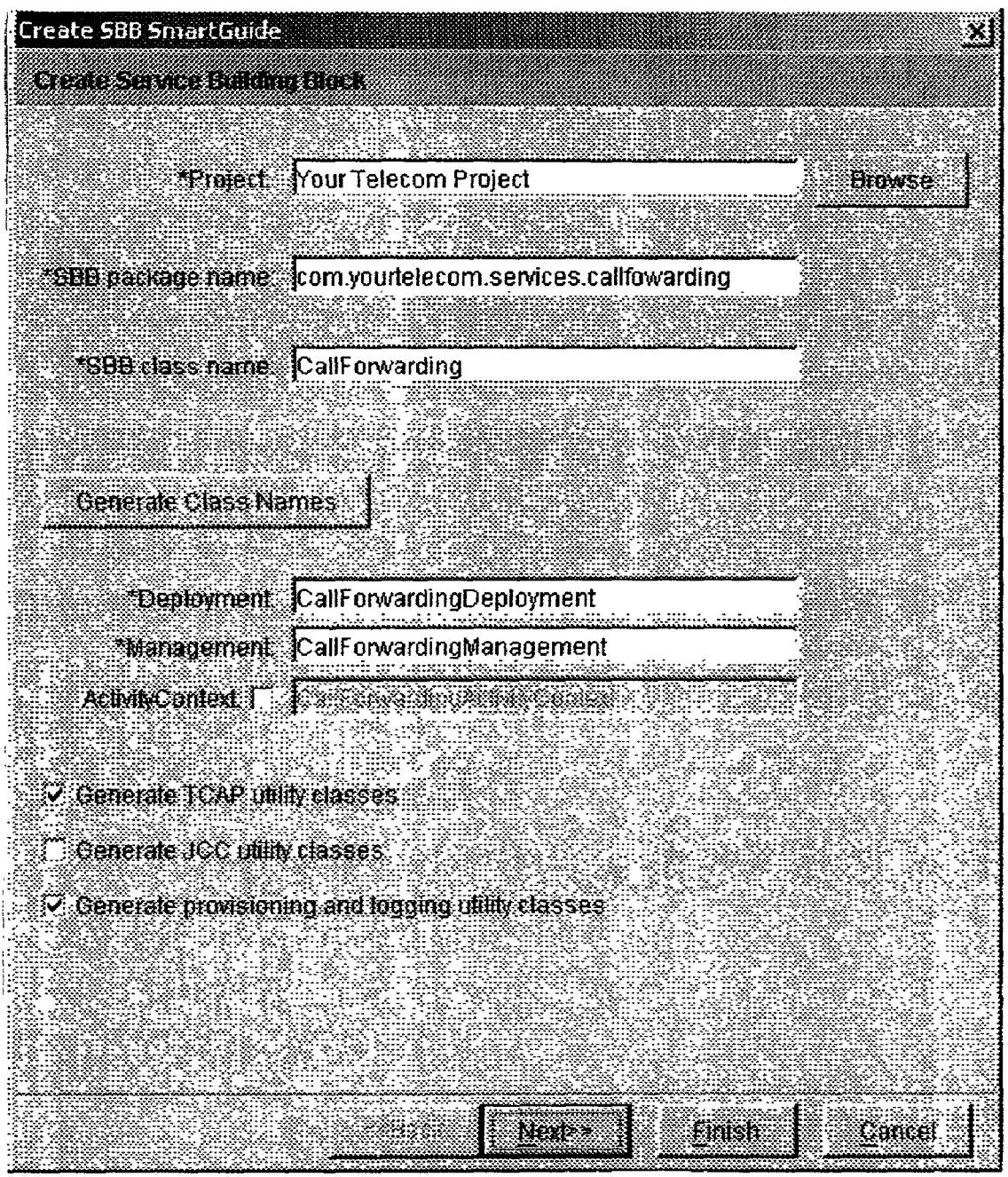
FIGS. 5A–5D, taken together, are screen capture illustrations which depict a smartguide for creating service building blocks in accordance with the inventive arrangements.
Figure 5B:
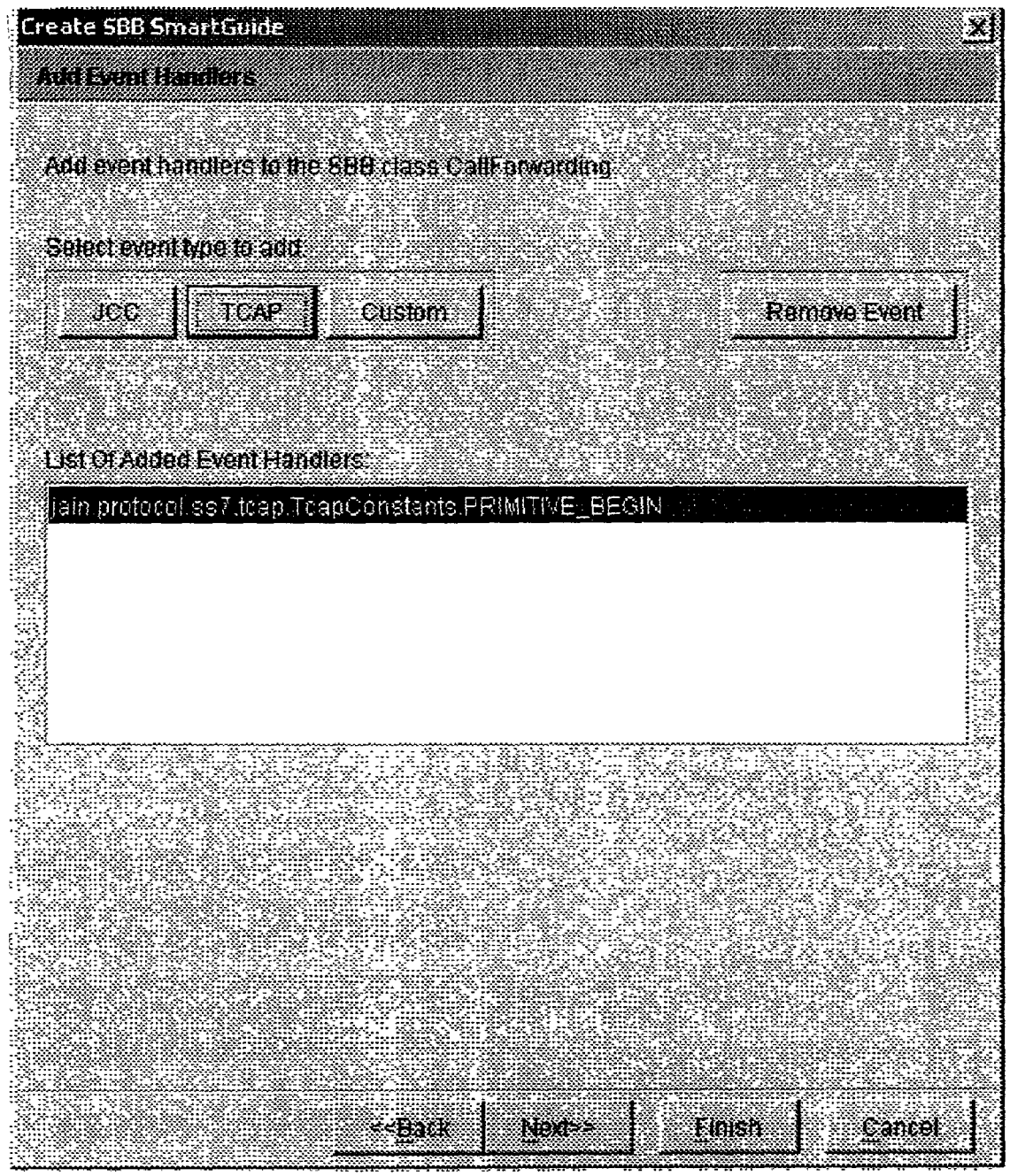
Figure 5C:
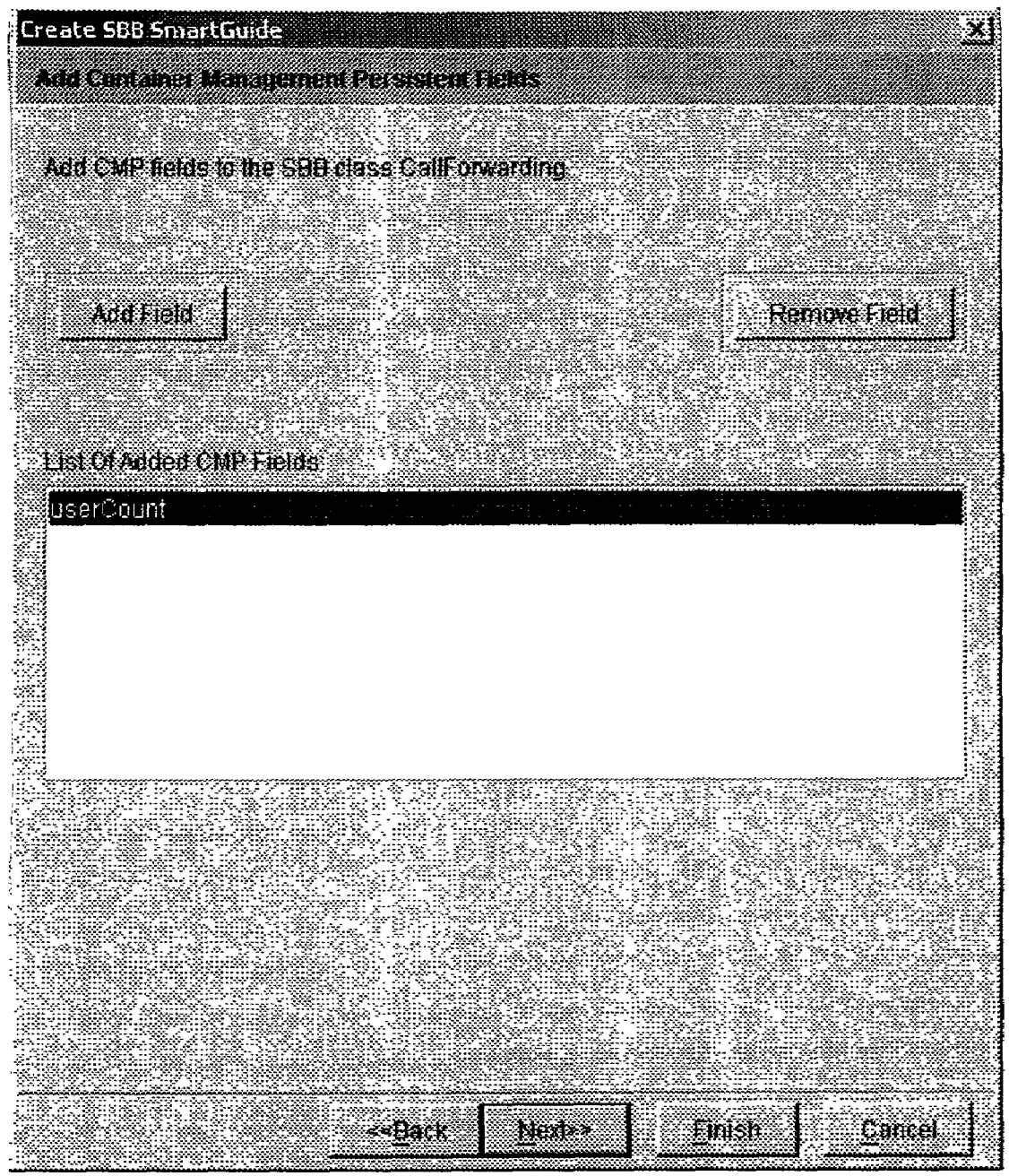
Figure 5D:
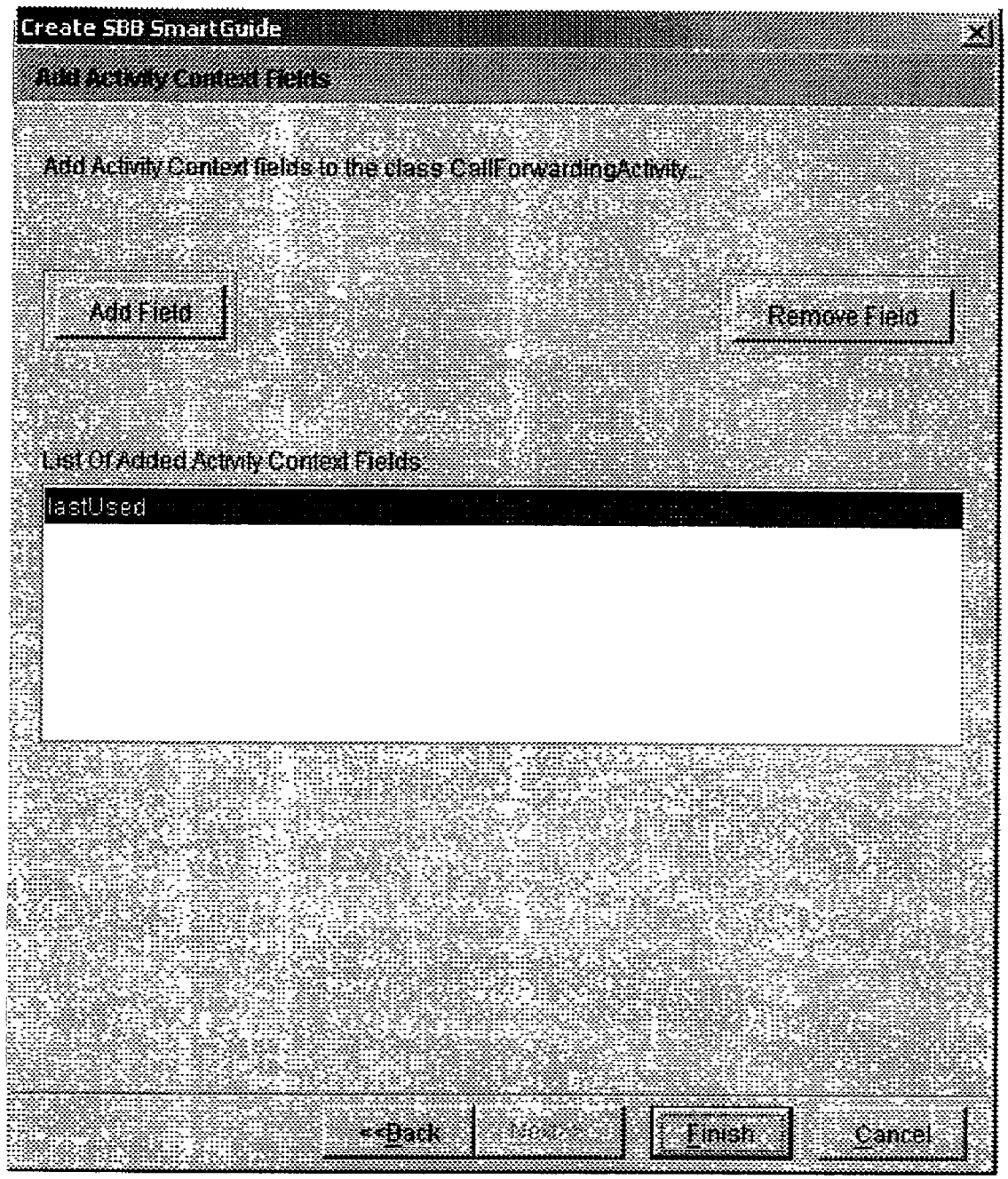
Figure 6A:
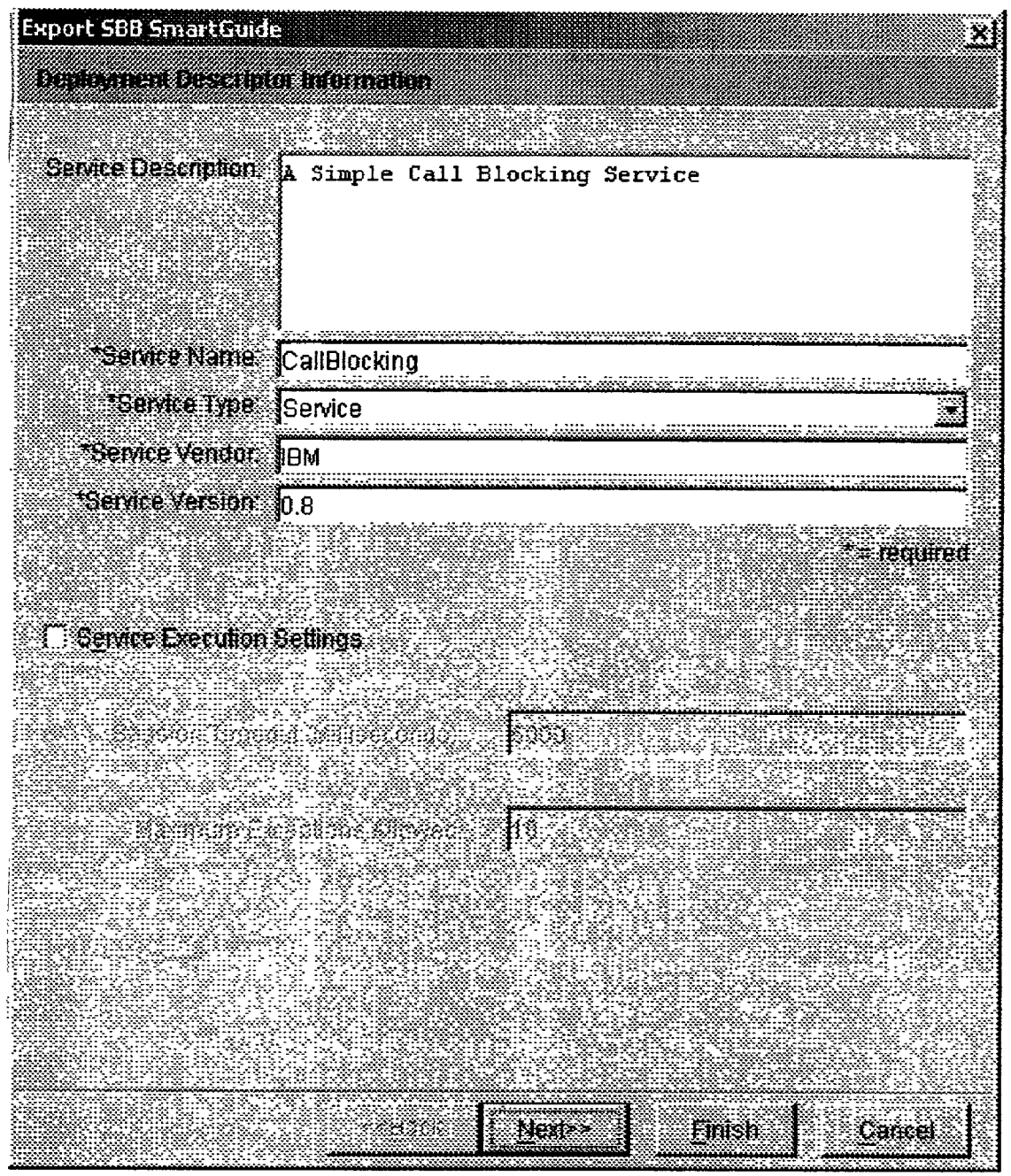
FIGS. 6A–6E, taken together, are screen capture illustrations which depict a smartguide for creating deployment descriptors based on the created service building blocks created by the smartguide illustrated in FIGS. 4A–4D.
Figure 6B:
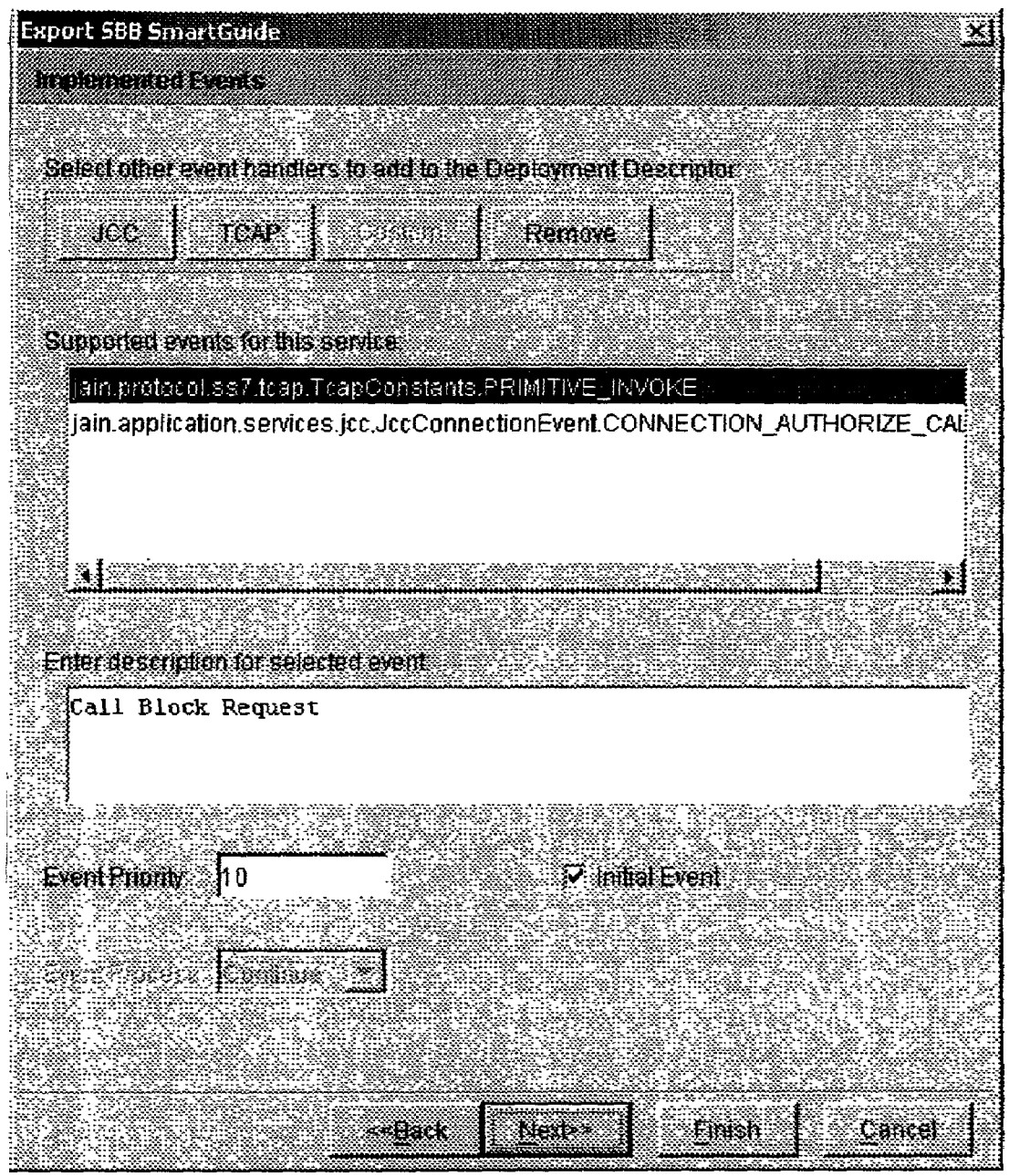
Figure 6C:
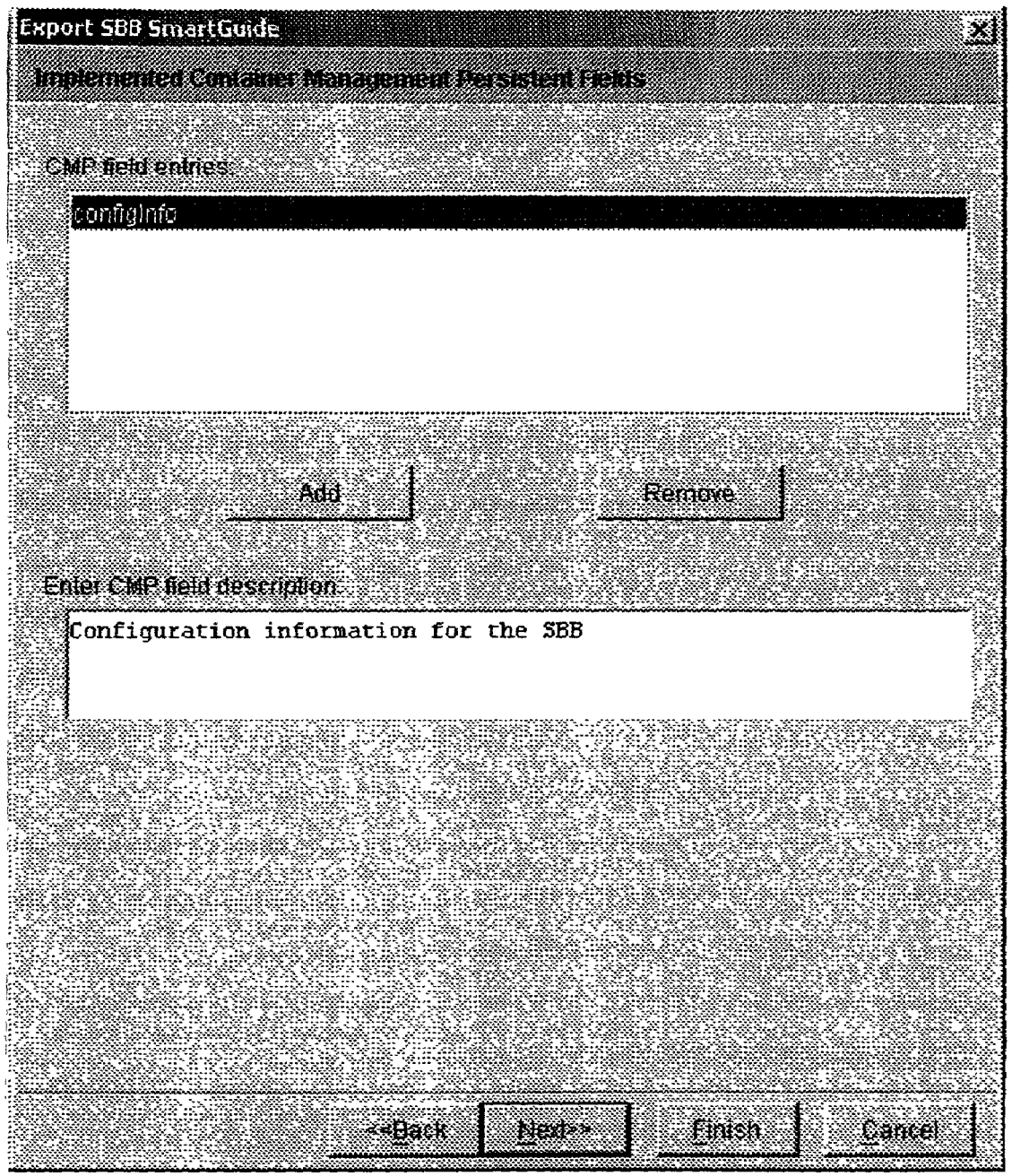
Figure 6D:
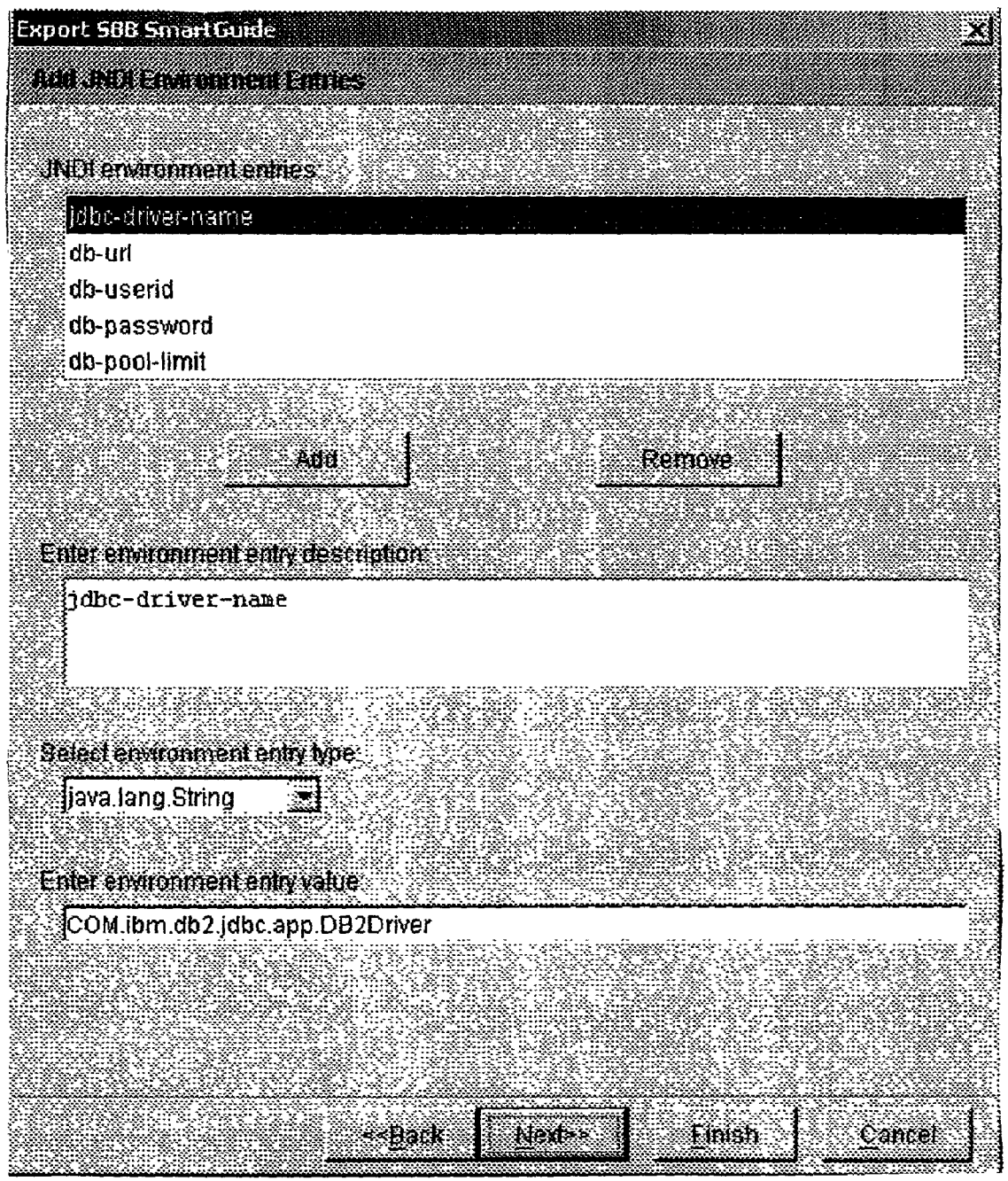
Figure 6E:
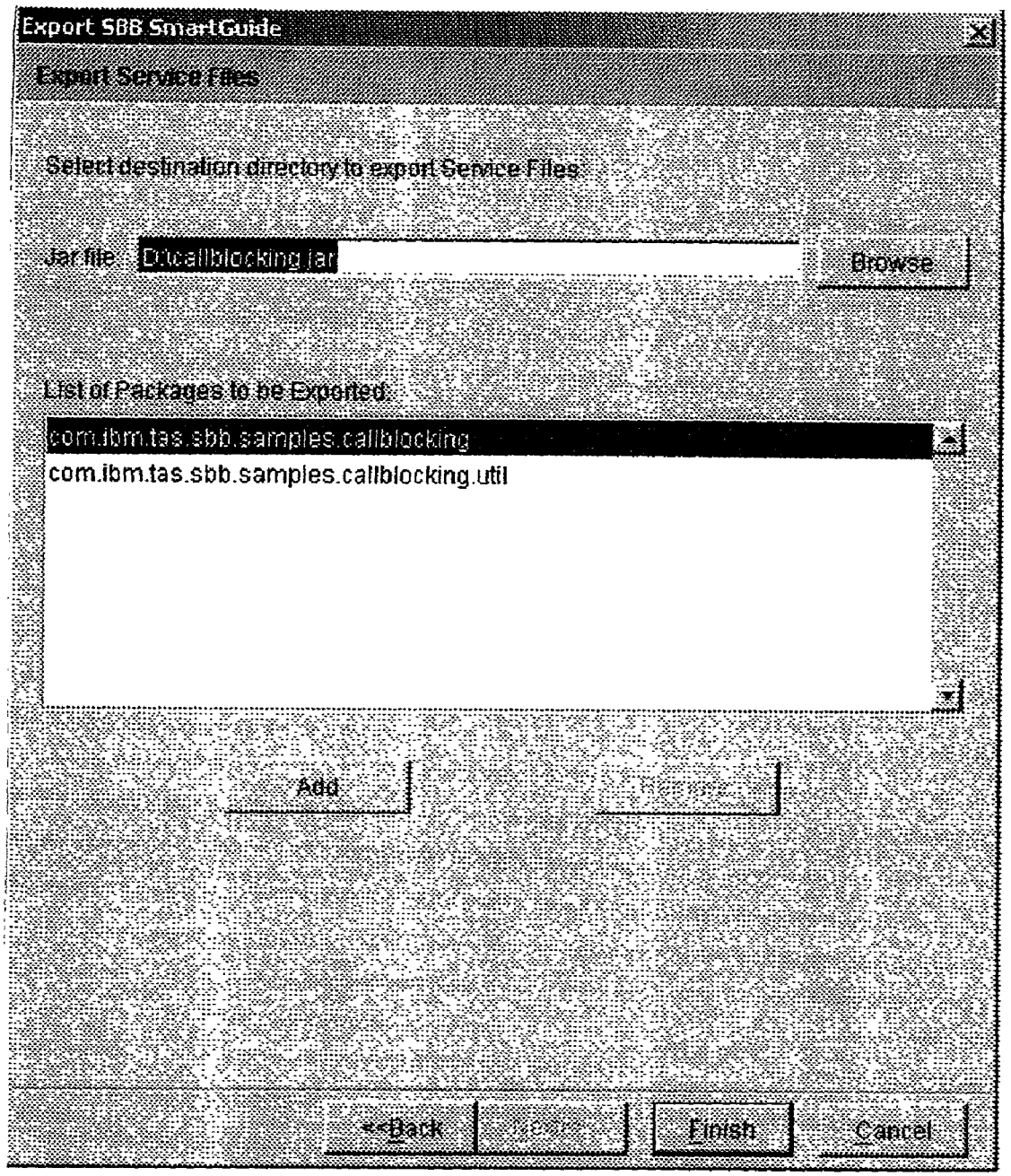

Both the service component 209 and the deployment descriptor 310 can be created using a visual tool which has been configured in accordance with the present invention. FIG. 4 is a schematic illustration of a visual tool which has been configured for use in the present invention. The visual tool 400 can include a first visual smartguide 410 for creating service building blocks 415, a second visual smartguide 420 for creating deployment descriptors 425 for the created service building blocks 415, and a visual composition interface 430 through which visual representations of the service building blocks 415 can be arranged to form the service component 450.

Notably, upon creation, the service building blocks 415 can be stored in a database 440 from which the visual composition interface 430 can access the created service building blocks 415. Similarly, upon creation, the deployment descriptors 425 can be stored in the database 440 from which the visual composition interface 430 can access the created deployment descriptors 425. Notably, the invention is not limited to a visual composition interface which can only process deployment descriptors 425 and service building blocks 415 which have been created by the visual tool 400. Rather, the visual tool 400 also can import service building blocks created not necessarily created using the visual tool 400. In any case, once a service component has been created by the visual tool 400, the service component can be deployed in a SLEE 460.

A user of the visual tool 400 can visually generating a service component by performing the following steps: First, the user can invoke a smart guide for constructing service building blocks. An exemplary smart guide for creating service building blocks is shown in the screen capture illustrations of FIGS. 5A–5D. Service building blocks are individual service operations which can be combined to form a service component. For instance, one type of service building block can be a call forwarding service. Another type of service building block can be a call blocking service. In any case, service building blocks can be combined to form a service component. Importantly, each service building block can include, at the minimum, meta-information for identifying the service building block and a list of event handlers which can handle particular events received from an event routing bus in a SLEE.

Once the necessary building blocks have been created using the service building block portion of the visual tool, the service building blocks can be exported for use a service component. FIGS. 6A–6E illustrate a second smartguide for use in exporting a service building block. The exportation process can include the generation of deployment descriptors for the service building blocks. Deployment descriptors can be used to encapsulate the meta-information which relates to the service building block. In particular, the deployment descriptor can not only specify identifying characteristics of a corresponding service building block, but also the deployment descriptor can specify which events the service building block can handle and which event handlers can handle the specified events when received in the SLEE.

Figure 7:
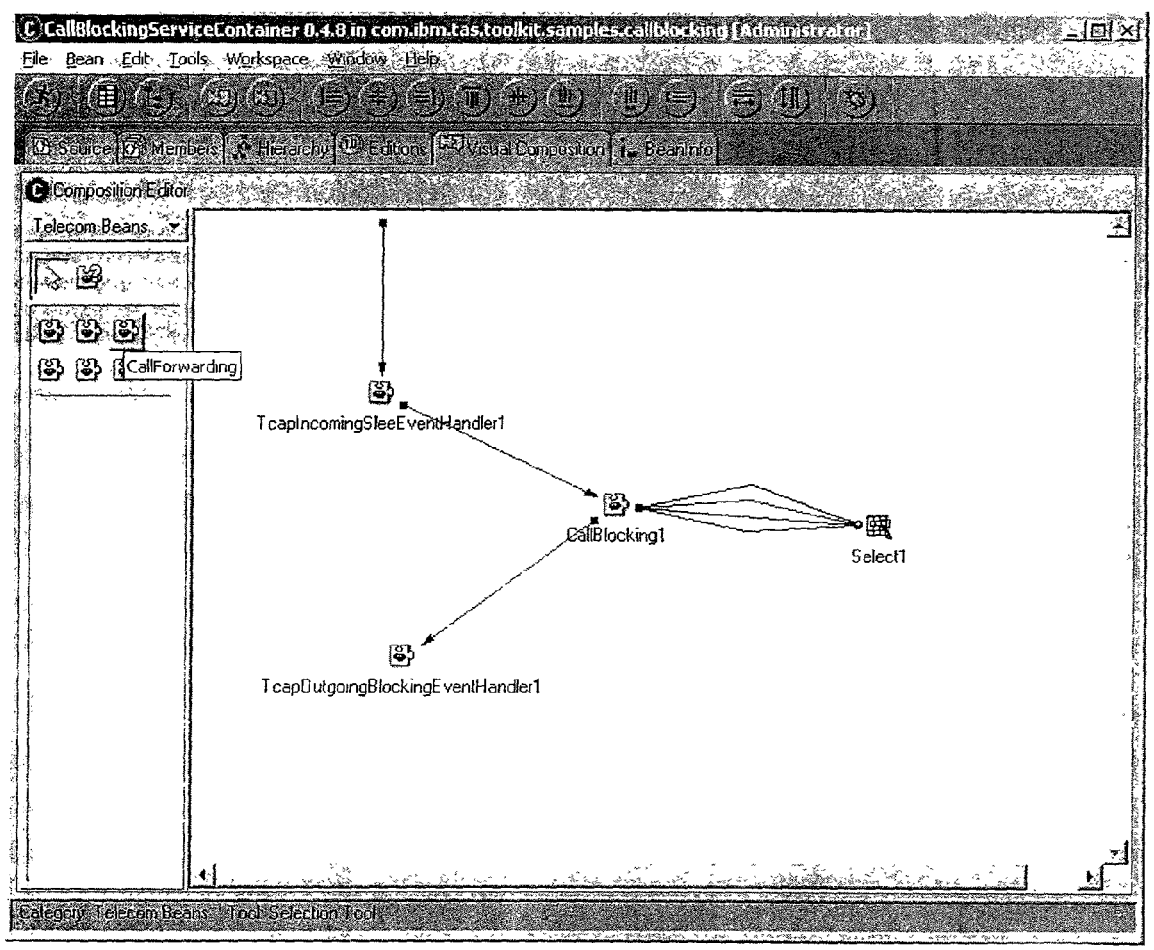
FIG. 7 is a screen capture illustration of a visual composition interface for arranging service building blocks into a service component for use in the SLEE of FIG. 2.

Finally, using a visual composition tool, individual service building blocks can be arranged using familiar drag and drop techniques. The arrangement can form a service component which can be inserted into a SLEE. FIG. 7 is a screen shot which illustrates the visual composition interface of the present invention. As will be apparent from the screen shot, service component developers can select individual service component building blocks which can be visually manipulated in the work space of the interface. In particular, visual representations of available service building blocks can be displayed in the left frame of the interface. The building blocks can be dragged into the work space and associated with other service building blocks using connectors. As connections are created, corresponding code can be automatically generated in accordance with the visual arrangement.

The present invention can be realized in hardware, software, or a combination of hardware and software. Moreover, the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A visual tool for creating an extended Java applications programming interface for generating an integrated networks Java Advanced Intelligent Network (JAIN) compliant telecommunication service component for use in a service logic execution environment (SLEE), comprising:

a first visual smartguide for creating JAIN-compliant service building blocks configured to receive and transmit telecommunication events to and from at least one JAIN configured protocol stack through a JAIN-compliant signaling layer, each said JAIN-compliant service building block comprising meta-information for identifying the service building block and a pre-defined list of different event handlers for handling specific telecommunication events received from an event routing bus in said SLEE, wherein said SLEE is configured for compatibility with a JAVA API for Integrated Networks (JAIN) specification for communicating with said JAIN-compliant service building blocks;

a second visual JAIN-compliant smartguide for creating deployment descriptors for said created JAIN-compliant service building blocks, each said deployment descriptor comprising a service description describing parameters for loading an instance of a JAIN-compliant service building block in said SLEE, an encapsulation of the meta-information corresponding to a particular one of the service building blocks, and a list of supported telecommunication events which are handled in the SLEE by an associated JAIN-compliant service budding block; and, a visual composition interface comprising a visual display within which visual iconic representations of said JAIN-compliant service building blocks are arranged in combination to form an extended JAIN-compliant telecommunication service component by performing drag-and-drop operations to move the visual iconic representations into a designated work space of the visual display and by connecting the visual iconic representations with visually displayed connectors, wherein in response to the drag-and-drop operations and connecting performed in the designated work space said extended JAIN-compliant telecommunication service component automatically configures itself using a deployment descriptor upon identifying underlying resources that are available when the JAIN-compliant telecommunication service component is unaware of the underlying JAIN protocol resources within the SLEE.

2. The visual tool of claim 1, wherein said JAIN-compliant service building blocks are JAIN-compliant software components for deployment in said SLEE.

3. The visual tool of claim 2, wherein said software components are Java beans.

4. The visual tool of claim 1, wherein said first visual smartguide comprises at least one selectable procedure for generating a plurality of JAIN telecommunication utility classes for inclusion in a JAIN-compliant service building block.

5. The visual tool of claim 1, wherein said first visual smartguide comprises a database of JAIN-compliant telecommunication event handlers from which said at least one JAIN-compliant telecommunication event handler is selected for addition to said JAIN-compliant service building block.

6. The visual tool of claim 1, wherein said second visual smartguide comprises a database of JAIN-compliant telecommunication event handlers from which a list of supported JAIN telecommunication events for inclusion in said deployment descriptor is constructed.

7. The visual tool of claim 1, further comprising a service container which encapsulates the JAIN-compliant service component.

8. The visual tool of claim 7, wherein said service container further comprises meta-information for exposing container characteristics for said service container.

9. The visual tool of claim 8, wherein said meta-information comprises a plurality of Java Native Definition Interface (JNDI) environment entries.

\* \* \* \* \*